United States Patent
Kamiya

(10) Patent No.: US 7,142,546 B2
(45) Date of Patent: Nov. 28, 2006

(54) DISTRIBUTED PIPELINE SCHEDULING METHOD AND SYSTEM

(75) Inventor: Satoshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 1028 days.

(21) Appl. No.: 09/814,714

(22) Filed: Mar. 23, 2001

(65) Prior Publication Data

US 2001/0026558 A1    Oct. 4, 2001

(30) Foreign Application Priority Data

Mar. 29, 2000    (JP) .................... 2000-091336

(51) Int. Cl.
  *H04L 12/28*    (2006.01)
  *H04L 12/56*    (2006.01)
(52) U.S. Cl. .................... 370/395.4; 370/412
(58) Field of Classification Search .............. None
  See application file for complete search history.

(56) References Cited

U.S. PATENT DOCUMENTS 5,724,351 A * 3/1998 Chao et al. ............ 370/395.42
5,805,849 A * 9/1998 Jordan et al. ................ 712/214
6,122,274 A * 9/2000 Kumar ....................... 370/388
6,269,439 B1 * 7/2001 Hanaki ....................... 712/235

FOREIGN PATENT DOCUMENTS

EP    1 009 189 A2    6/2000

OTHER PUBLICATIONS

A. Smiljanić et al., "RRGS-Round-Robin Greedy Scheduling for Electronic/Optical Terabit Switches", Globecom 99, Nov. 1999, 7 pages.

* cited by examiner

Primary Examiner—Steven Nguyen
Assistant Examiner—Daniel Ryman
(74) Attorney, Agent, or Firm—Foley & Lardner LLP

(57) ABSTRACT

In a distributed pipeline scheduling method for a system which includes a plurality of input ports for inputting data, a plurality of output ports for outputting data, a data switch element for switching the data input from the input ports and transferring the data to the output ports, and a scheduler having a distributed scheduling architecture for controlling the data switch element, and determines connection reservations between the input ports and the output ports, the scheduler independently assigns time slots to information transfer processing and reservation processing. Processing information transfer processing and reservation processing are performed in the assigned time slots in a pipeline fashion. A distributed pipeline scheduling system and distributed scheduler are also disclosed.

7 Claims, 13 Drawing Sheets

DISTRIBUTED PIPELINE SCHEDULING METHOD AND SYSTEM

BACKGROUND OF THE INVENTION

The present invention relates to a packet switching system and, more particularly, to a pipeline scheduling method and system for the packet switch of a packet switching system.

Some recent packet switching systems use an input buffer type switch having N inputs and N outputs (N is a natural number) and N virtual output queuing (VOQ) elements in each input section.

FIG. 8 shows a conventional, general input buffer type packet switch having N inputs and N outputs (N is a natural number). Referring to FIG. 8, a packet switch 40 includes a plurality of input ports for inputting data, a plurality of output ports for outputting data, a data switch element 54 for transferring data input from the input ports to the output ports by switching them, and a scheduler 50 for controlling the data switch element 54.

Each input port has virtual output queuing (VOQ) elements 52. As the switch element 54, a cross-bar switch may be used. The scheduler 50 has a distributed scheduling architecture and is comprised of distributed scheduling modules 51-$i$ ($i$=1 to N) arranged for the respective input ports. The packet switch 40 performs transfer within the cross-bar switch by using fixed-size packets. With this operation, the operation time of the switch system is quantized. This quantization unit will be referred to as a time slot.

The scheduler 50 receives pieces of connection request information (REQ) from the respective input ports for the respective output ports in units of time slots, and determines connection permission information (GRANT) between the input ports and the output ports on the basis of the connection request information. The scheduler 50 generates connection information (MSEL) between the input ports and the output ports on the basis of the connection permission information, and notifies the switch element 54 of the generated information, thereby setting input/output connections in the switch element 54.

The scheduler 50 generates, on the basis of connection permission information, transfer permission information (DSTMSG) indicating a specific output port from which data transfer is permitted with respect to each input port, and notifies each input port of the transfer permission information. Each input port outputs data to the switching element in accordance with the transfer permission information, and the corresponding output port receives the data, thereby completing switching.

The purpose of the scheduler 50 is to generate N×N pieces of connection permission information from N×N pieces of connection request information. To generate connection permission information, each of distributed scheduling modules 51-1 to 51-N determines connection permission/inhibition for each input port with respect to the corresponding output port. An output port to which a given distributed scheduling module 51-$n$ ($n$ is a natural number; $1 \leq n \leq N$) has given connection permission is a port "reserved" by another distributed scheduling module from the viewpoint of a distributed scheduling module 51-$m$ ($m \neq N$); connection permission cannot be given to this port. When a given distributed scheduling module determines connection permission for a given output port, this operation will be expressed as "reserving an output port" hereinafter.

As a distributed scheduling algorithm for a packet switch, an RRGS (Round Robin Greedy Scheduling) algorithm is available, which is disclosed in A. Smiljanic et al., "RRGS-Round-Robin Greedy Scheduling for Electronic/Optical Terabit Switches", Globecom 99, November 1999.

In a scheduler using the RRGS algorithm, distributed scheduling modules are connected in a ring form, and messages are exchanged between adjacent distributed scheduling modules. According to the RRGS algorithm, each distributed scheduling module reserves (connection permission determination) a target time slot, and passes the resultant information to the next distributed scheduling module. The RRGS algorithm uses a pipeline function to relax the required message transfer rate condition.

A reservation process for a given time slot is completed when one cycle of message transfer is done among the respective distributed scheduling modules. In addition, according to the RRGS algorithm, N distributed scheduling modules reserve time slots at least N slots ahead of the current slot. Furthermore, in the RRGS algorithm, reservation processes for N time slots are made to simultaneously proceed with a phase shift of one time slot.

This RRGS algorithm may be modified such that reservation processes for a plurality of time slots are started at once from different distributed scheduling modules and made to proceed so as to be terminated simultaneously. This algorithm will be referred as framed RRGS hereafter.

FIG. 9 shows the arrangement of a distributed scheduler using RRGS and framed RRGS. FIG. 9 shows an arrangement with port count N=4 as an example. Referring to FIG. 9, the scheduler is comprised of IMs (Input Modules) 10-1 to 10-4. Each module 10-$i$ ($i$=1 to 4) receives a frame pulse (FP) 21 indicating the head of a frame. Each module 10-$i$ operates in synchronism with the frame pulse 21.

For each module 10-$i$, a physical number 23-$i$ for module identification is set. Connection request information 11-$i$ is input from each input port to the corresponding module 10-$i$, and the module 10-$i$ determines a reservation (connection permission) in accordance with the arbitration result on the connection request, and outputs a corresponding one of pieces of connection permission information 12-1 to 12-4.

According to RRGS and framed RRGS, contention of connection requests for an output port is avoided by exchanging "output port reservation information", which is information obtained by degenerating input port information from connection permission information (information generated by referring to input port information), between adjacent distributed scheduling modules. For example, the module 10-3 receives output port reservation information 14-2 from the preceding module 10-2 as output port reservation information 13-3, and uses it for arbitration of connection requests. Upon determining connection permission information, the module 10-3 notifies the succeeding module 10-4 of output port reservation information 14-3.

FIG. 10 shows scheduling based on RRGS disclosed in the above reference in a case where an odd number of ports are used. FIG. 10 shows a case where port count N=5, and a reservation sequence from time slot (TS) 6.

Scheduling for TS6 is executed as follows. TS1 represents a scheduling start time slot; and TS5, an end time slot. Reserving operation is started from a distributed scheduling module IM1 and ended at a distributed scheduling module IM5. First of all, in TS1, the distributed scheduling module IM1 performs reserving operation, and transfers output port reservation information for TS6 to a distributed scheduling module IM2.

In TS2, the distributed scheduling module IM2 performs reserving operation, and transfers output port reservation information for TS6 to a distributed scheduling module IM3. Subsequently, the distributed scheduling module IM3 performs reserving operation and information transfer in TS3, and a distributed scheduling module IM4 performs reserving operation and information transfer in TS4. When a distributed scheduling module IM5 performs reserving operation in TS5, reserving operation of the distributed scheduling modules for TS6 is completed, and the reservation result is used in TS6.

Scheduling for TS7 is performed by making the distributed scheduling modules IM5, IM1, IM2, IM3, and IM4 sequentially perform reserving operation and transfer output port reservation information in the interval between TS2 and TS6 in the order named. Subsequently, scheduling for TS8 and TS9 is executed in the same manner.

In this case, at the respective times, the respective distributed scheduling modules IM execute reserving operations for different times. For example, in TS5, the distributed scheduling module IM1 executes reserving operation for reservation time slot TS8; the distributed scheduling module IM2, for TS10; the distributed scheduling module IM3, for TS7; the distributed scheduling module IM4, for TS9; and the distributed scheduling module IM5, for TS6.

FIG. 11 shows scheduling based on RRGS disclosed in the above reference in a case where an even umber number of ports are used. FIG. 11 shows a case where port count N=4, and a reservation sequence from time slot (TS) 6.

This case differs from that in FIG. 10 in that when a reservation in a given time slot is executed, information transfer must be stopped in a time slot in the process of reserving operation. Referring to FIG. 11, the hatched portions represent such time slots in which information transfer must be stopped. As described above, according to RRGS, pipeline processing differs depending on whether the number of input ports is an even or odd number.

FIG. 12 shows a case where port count N=4, and a reservation sequence from TS5.

This scheduling operation differs from scheduling operations based on RRGS in FIGS. 10 and 11 in that the respective distributed scheduling modules IM1 to IM4 simultaneously start reserving operations for different time slots at a given timing, and also simultaneously terminate the reserving operations.

In the above distributed scheduling algorithm, each input module IM must perform reception of output port reservation information, expansion of the received information, reservation processing and updating of information by using the received information, format conversion of the updated information, and transmission of the information. According to the above conventional algorithm, the above processing is completed in one time slot (TS) in a time chart.

FIG. 13 shows the details of each time slot (TS) in FIGS. 10 to 12. Referring to FIG. 13, one time slot in FIGS. 10 to 12 is expressed as the interval between time T0 and time T4.

More specifically, each input module IM receives information from the adjacent input module IM in the interval between time T0 and time T1. Each module expands the information in the interval between time T1 and time T2. In this interval, the module converts the information into parallel information if the information was transferred serially. In the interval between time T2 and time T3, the module executes reservation processing. In the interval between time T3 and time T4, the module converts the information into a format for transfer. In this interval, for example, the module performs serial/parallel conversion or the like to serially transfer the information. In the interval between time T4 and time T5, the module transmits the information to the adjacent input module IM (the interval between T0 and T1 is equal to the interval between T4 and T5).

As described above, when reservation processing (T2 to T3) and other processing (to be referred to as transfer processing hereinafter) are to be executed within a single time slot, the times assigned to the respective processes are limited. This makes it difficult to flexibly cope with an increase in the number of ports by using the conventional algorithm. If, for example, the number of ports increases, the time required for a given input port to select one of output ports and perform reserving operation for the port is prolonged in reservation processing (T2 to T3). In addition, as the number of ports increases, the amount of output port reservation information to be transferred between the input modules IM increases.

Furthermore, when output port reservation information is to be serially transferred, the information transfer time (T0 to T1), information expansion time (T1 to T2), format conversion time (T3 to T4), and information transfer time (T4 to T5) are prolonged. Since the total time of these times and the above reservation processing time must be limited within one time slot, severe limitations are imposed on the number of ports.

When output port reservation information is to be transferred in parallel, the information expansion time (T1 to T2) and format conversion time (T3 to T4) can be omitted. In this case, however, the number of signal lines required for transfer between the IMs increases. When, therefore, IMs are to be implemented by a Large Scale Integration (LSI), the number of terminals of the LSI becomes too large to integrate the IMs into one LSI.

SUMMARY OF THE INVENTION

It is an object of the present invention to provide a distributed pipeline scheduling method and system which are tolerant of processing time limitations.

In order to achieve the above object, according to the present invention, there is provided a distributed pipeline scheduling method for a system which includes a plurality of input ports for inputting data, a plurality of output ports for outputting data, a data switch element for switching the data input from the input ports and transferring the data to the output ports, and a scheduler having a distributed scheduling architecture for controlling the data switch element, and determines connection reservations between the input ports and the output ports, comprising the steps of causing the scheduler to independently assign time slots to information transfer processing and reservation processing, and processing information transfer processing and reservation processing in the assigned time slots in a pipeline fashion.

DESCRIPTION OF THE PREFERRED EMBODIMENTS

The present invention will be described in detail below with reference to the accompanying drawings.

Figure 9:
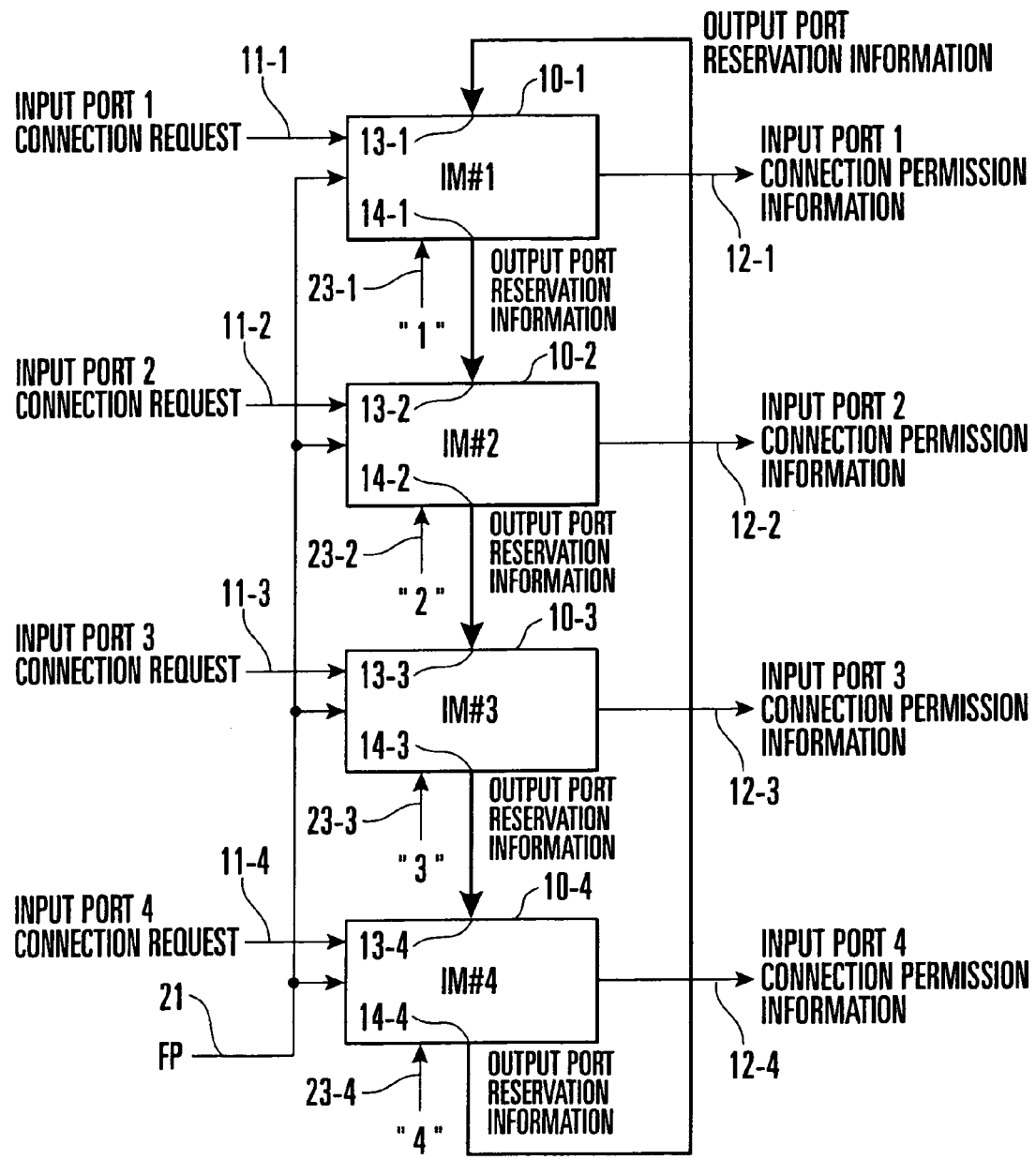
FIG. 9 is a block diagram of a distributed scheduler using RRGS and framed RRGS.
Figure 10:
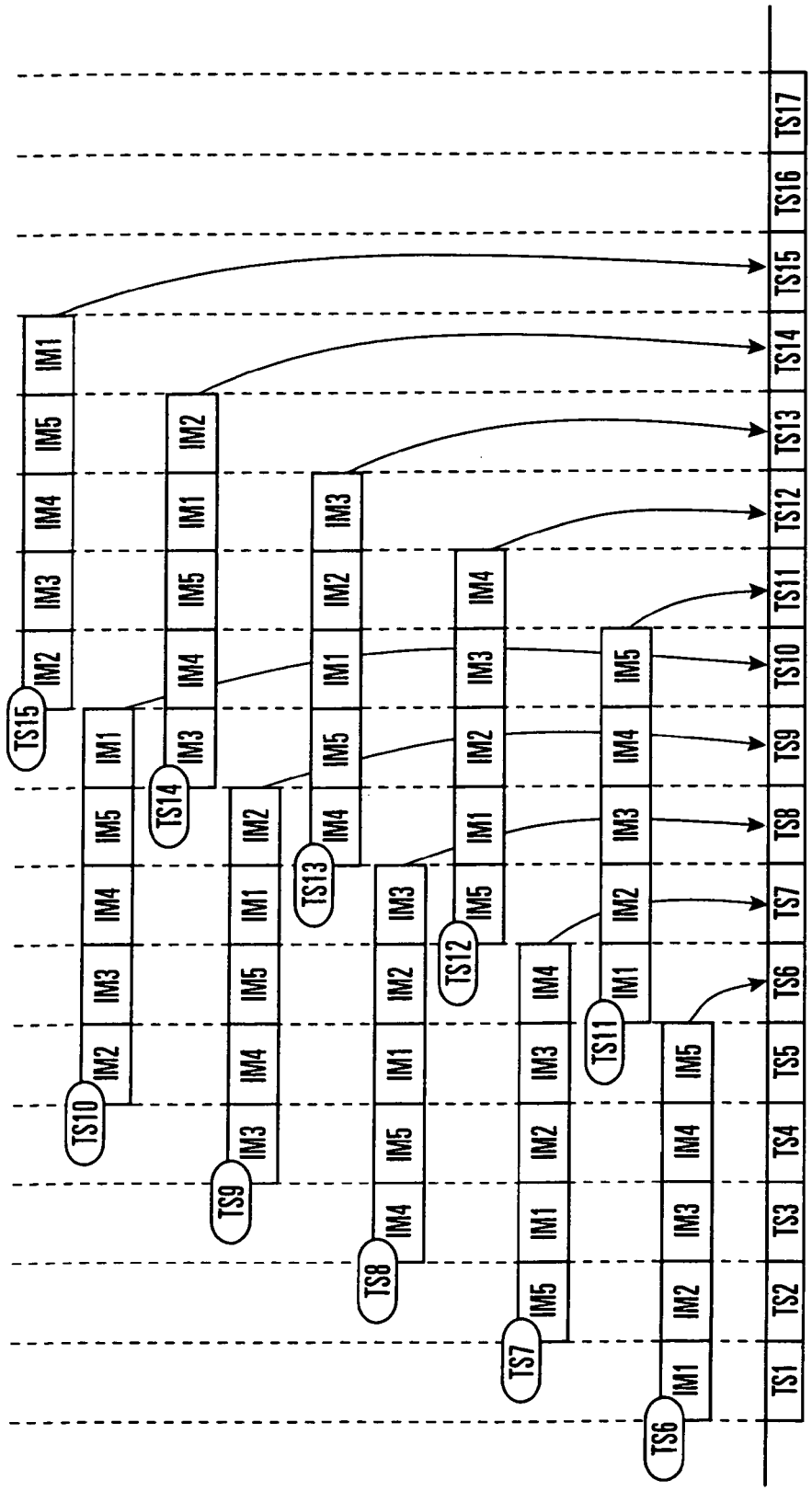
FIG. 10 is a timing chart showing scheduling based on RRGS in a case where an odd number of ports are used.
Figure 11:
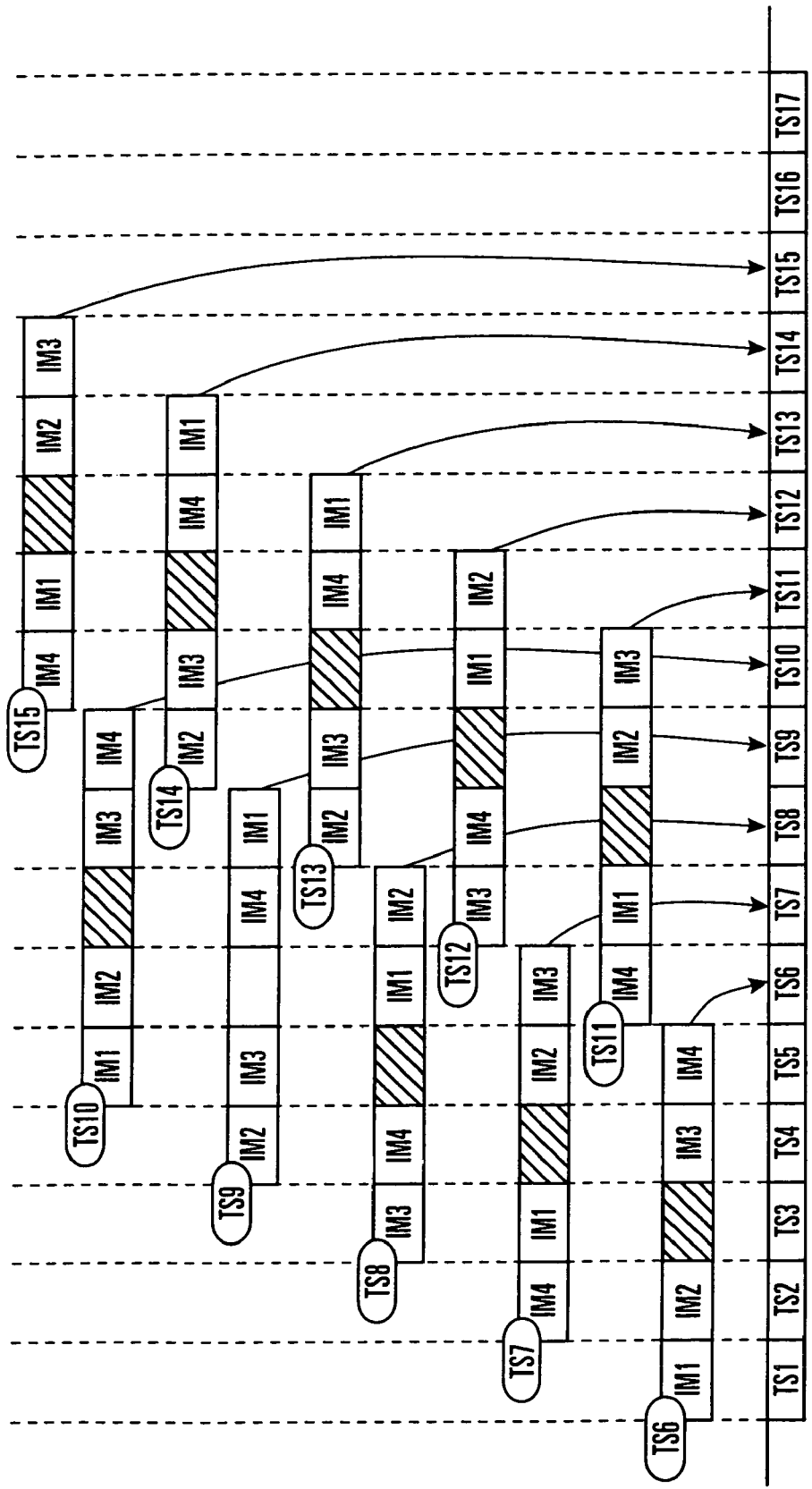
FIG. 11 is a timing chart showing scheduling based on RRGS in a case where an even number of ports are used.
Figure 12:
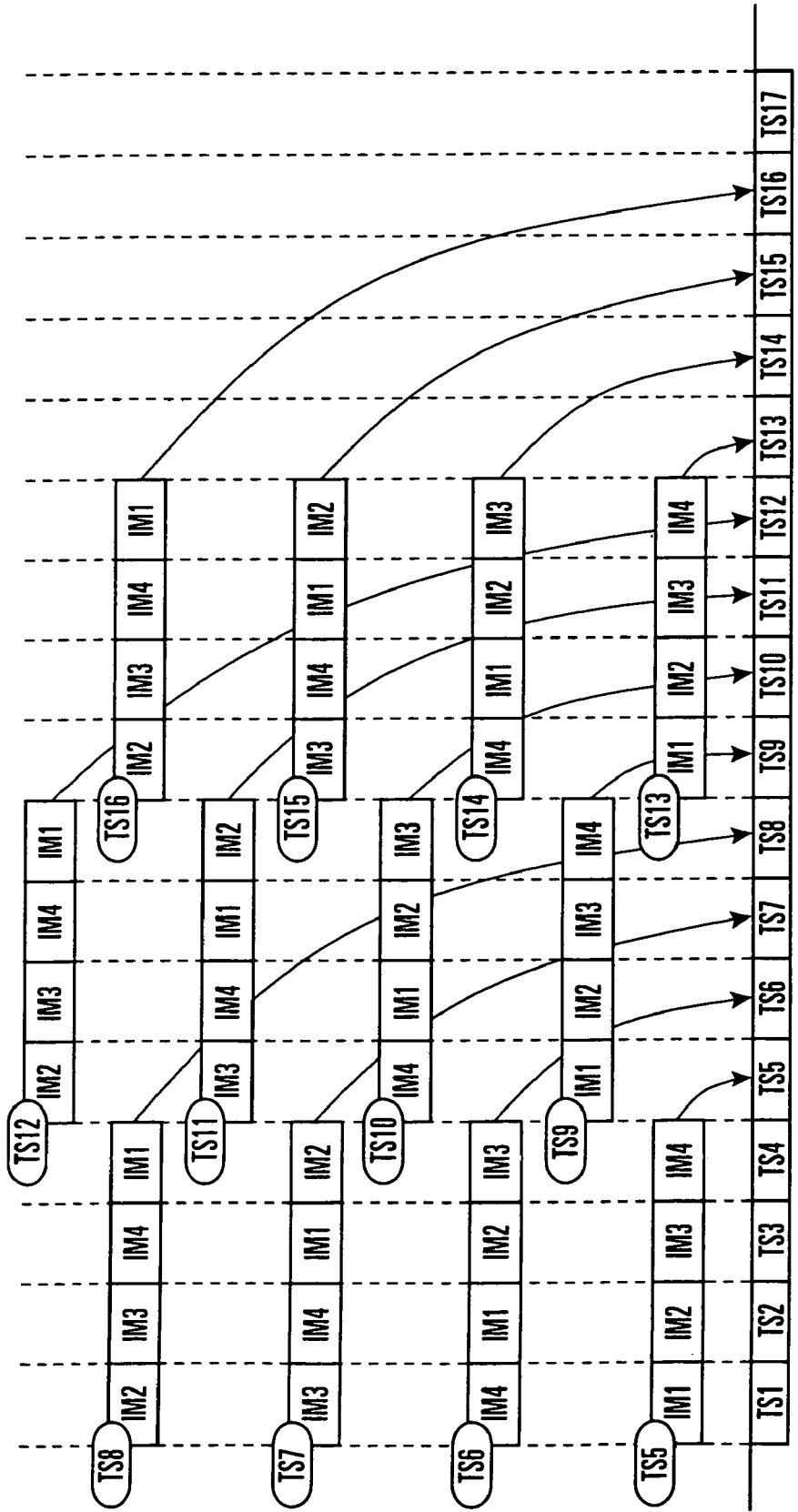
FIG. 12 is a timing chart showing scheduling based on framed RRGS.
Figure 13:
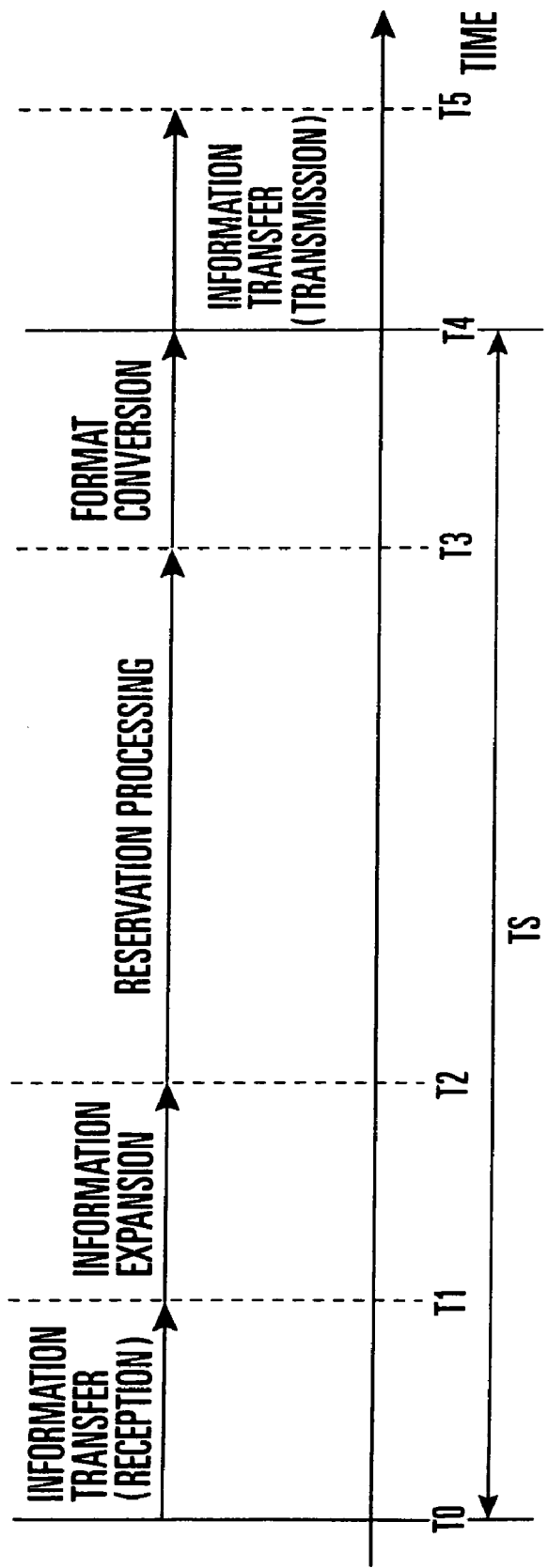
FIG. 13 is a timing chart showing the operation of each input module in one time slot (TS).

A scheduler to which the present invention is applied has the same arrangement as that shown in FIG. 9 except for operation in time slots, and hence will be described below with reference to FIG. 9. Referring to FIG. 9, port count N=4, and the scheduler to which the present invention is applied is comprised of input modules 10-$i$ equal in number to the ports, i.e., input modules 10-1 to 10-4.

A frame pulse (FP) 21 indicting the head of a frame is input to each module 10-$i$. In each module 10-$i$, a physical number 23 for module identification is set in each module 10-$i$. In addition, each module 10-$i$ receives connection request information 11-$i$ and output port reservation information 13-$i$. The module 10-$i$ determines connection permission (reservation) by arbitrating connection requests, and outputs connection permission information 12-$i$ and updated output port reservation information 14-$i$. Output port reservation information 14 output from each module 10 is input as output port reservation information 13 for the succeeding module.

Figure 1:
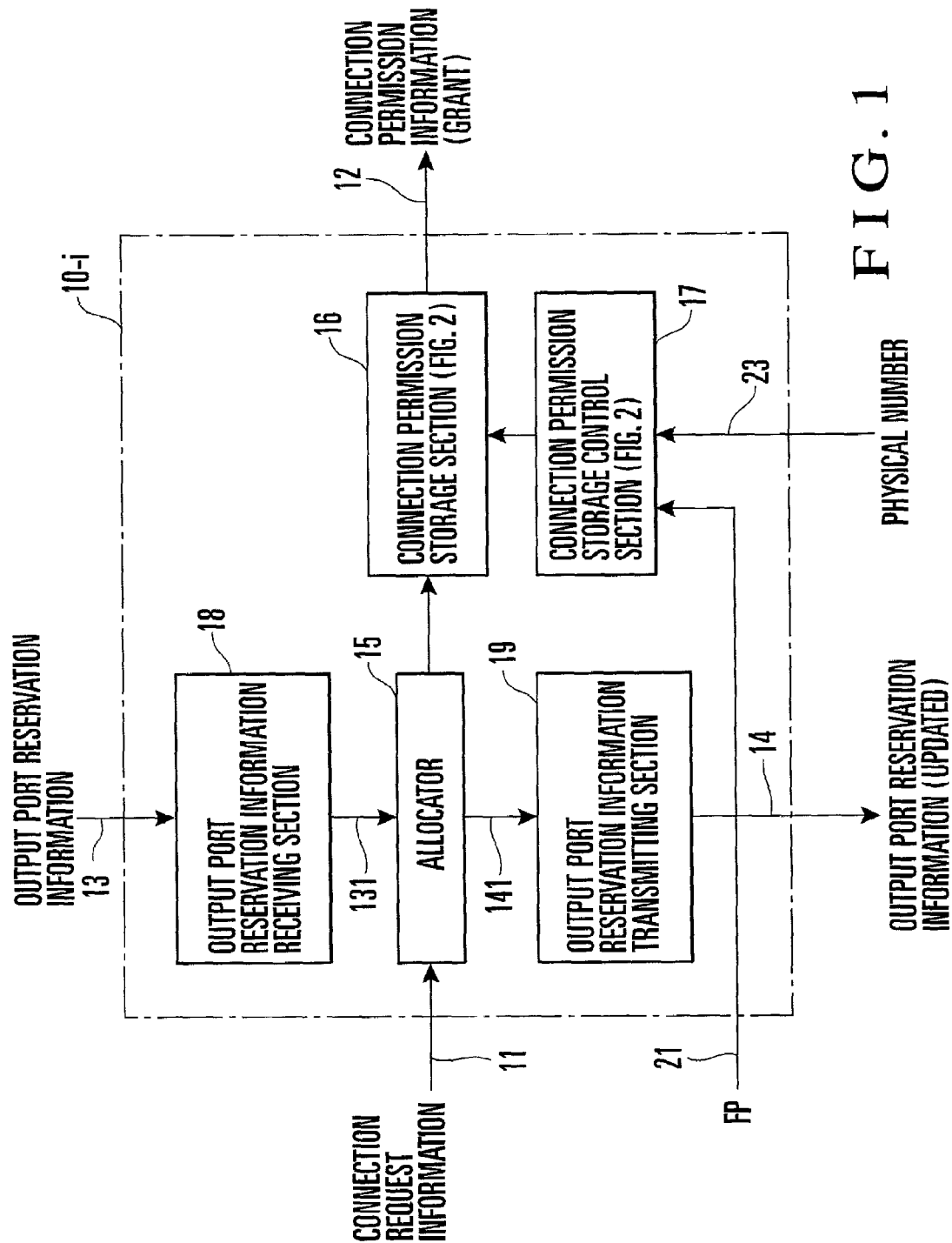
FIG. 1 is a block diagram of an input module in FIG. 9.

FIG. 1 shows the detailed arrangement of each module 10-$i$ in FIG. 9. The module 10-$i$ includes an allocator 15, connection permission storage section 16, connection permission storage control section 17, output port reservation information receiving section 18, and output port reservation information transmitting section 19.

The output port reservation information receiving section 18 receives the output port reservation information 13 from the preceding module, performs serial/parallel conversion and format conversion, and notifies the allocator 15 of output port reservation information 131.

On the basis of connection request information 11 and the output port reservation information 131 output from the output port reservation information receiving section 18, the allocator 15 determines connection permission information 12 for an output port with respect to the input port managed by this module and updates the output port reservation information. As an algorithm for determination, a known algorithm is used. Updated output port reservation information 141 is notified to the output port reservation information transmitting section 19.

The output port reservation information transmitting section 19 performs format conversion and parallel/serial conversion for the output port reservation information 141 output from the allocator 15, and outputs the updated output port reservation information 14 to the succeeding module.

Figure 2:
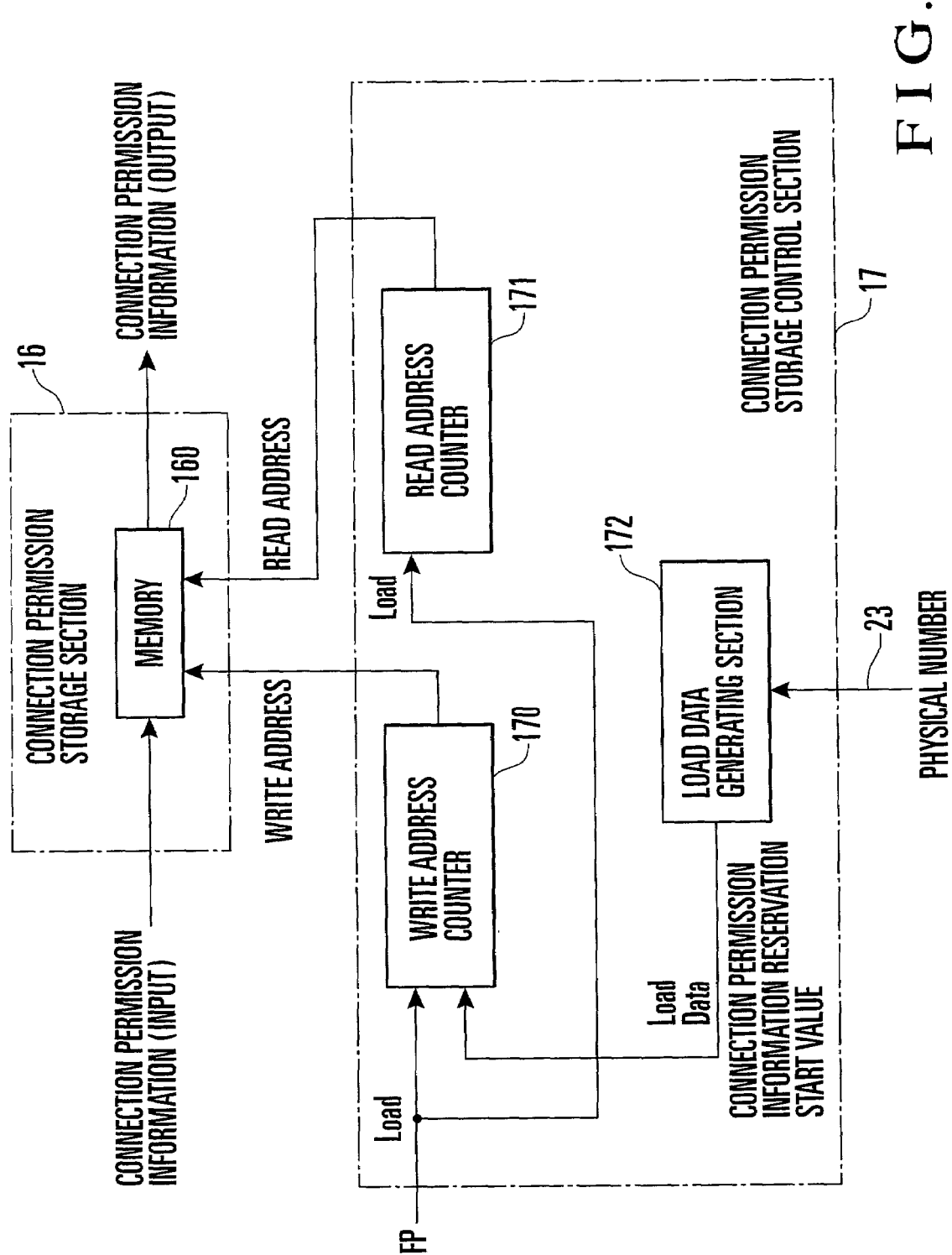
FIG. 2 is a block diagram of a connection permission storage section and connection permission storage control section in FIG. 1.

The connection permission storage section 16 stores the connection permission information 12 determined by the allocator 15 until the time of a time slot in which this information is used. The connection permission storage section 16 has a memory 160 for storing connection permission information, as shown in FIG. 2.

The connection permission storage control section 17 determines a reservation sequence pattern of connection permission information in the corresponding module from the physical number 23 for module identification in synchronism with the frame pulse (FP) 21, and controls a write/read sequence of the connection permission information 12 in units of time slots. As shown in FIG. 2, the connection permission storage control section 17 is comprised of a write address counter 170 for generating a write address for the memory 160 of the connection permission storage section 16, a read address counter 171 for generating a read address for the memory 160, and a load data generating section 172.

The load data generating section 172 determines a connection permission information reservation start value from the physical number 23. The write address counter 170 sets the connection permission information reservation start value as load data, and a frame pulse as a load input. The read address counter 171 sets a frame pulse as a load input. Both these counters 170 and 171 perform counting operation in accordance with a clock (not shown) whose period is equal to a time slot time. The count values are respectively input as a write address and read address to the memory 160 in the connection permission storage section 16, thereby writing/reading connection permission information.

Figure 3:
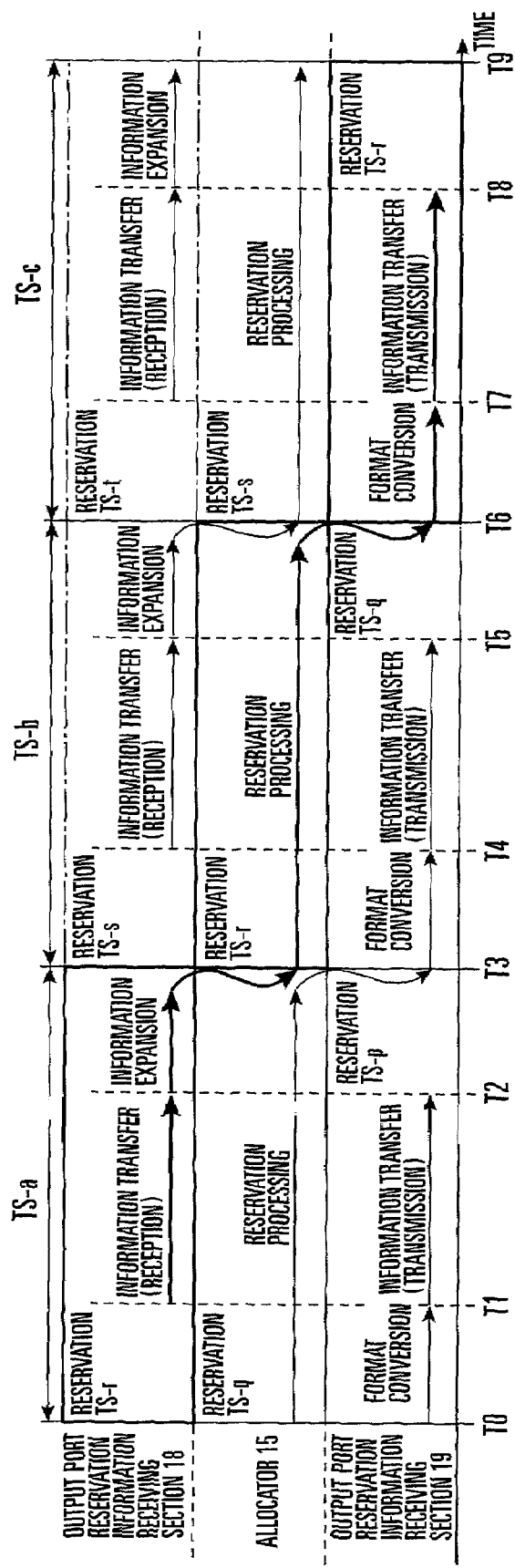
FIG. 3 is a timing chart showing the operation of each input module in FIG. 1.

Operation of each input module described above on a time-slot basis will be described next with reference to FIG. 3. Referring to FIG. 3, a time slot TS includes a time slot TS-a from time T0 to time T3, a time slot TS-b from time T3 to time T6, and a time slot TS-c from time T6 to T9.

The time (T1 to T2, T4 to T5, T7 to T8) during which the output port reservation information receiving section 18 and output port reservation information transmitting section 19 perform information transfer remains unchanged in the respective time slots. The time (T2 to T3, T5 to T6, T8 to T9) during which the output port reservation information receiving section 18 performs information expansion also remains unchanged in the respective time slots. In addition, the time (T0 to T1, T3 to T4, T6 to T7) during which the output port reservation information transmitting section 19 performs format conversion remains unchanged in the respective time slots.

Consider reservation processing for a time slot TS-r which is performed by the allocator 15 in the time slot TS-b. The output port reservation information receiving section 18 receives the output port reservation information 13 from the preceding module in the interval between time T1 and time T2 in TS-a. The output port reservation information receiving section 18 performs expansion processing for the output port reservation information in the interval between time T2 and time T3 in TS-a, and outputs the output port reservation information 131 at time T3.

The allocator 15 executes reservation processing in the interval between time T3 and time T6 in TS-b. At the same time, the allocator 15 determines connection permission information for an output port, and outputs the updated output port reservation information 141. The output port reservation information transmitting section 19 performs format conversion in the interval between T6 and T7 in TS-c, and transmits the output port reservation information 14 to the succeeding module in the interval between T7 and T8.

The reservation information at a given reservation time which is determined by the allocator 15 is written and stored in the connection permission storage section 16 under the control of the connection permission storage control section 17. The determined reservation information is read out from the connection permission storage section 16 at a predetermined reservation time under the control of the connection permission storage control section 17 and used.

As described above, this module performs processing for the reservation time slot TS-r in three time slots, i.e., TS-a, TS-b, and TS-c.

Consider the time slot TS-b next. In this time slot, the output port reservation information receiving section 18 executes information reception processing and information expansion processing for a reservation time slot TS-s. At the same time, the allocator 15 executes reservation processing for the reservation time slot TS-r, and the output port reservation information transmitting section 19 executes format conversion processing and information transmission processing for a reservation time slot TS-q.

In this manner, the output port reservation information receiving section 18, allocator 15, and output port reservation information transmitting section 19 of the module 10-*i* execute processing for different reservation time slots at the same time. That is, in this module, the output port reservation information receiving section 18, allocator 15, and output port reservation information transmitting section 19 execute pipeline processing.

Scheduling operation based on RRGS and framed RRGS according to the present invention, which uses the distributed scheduling modules described above, will be described next.

Figure 4:
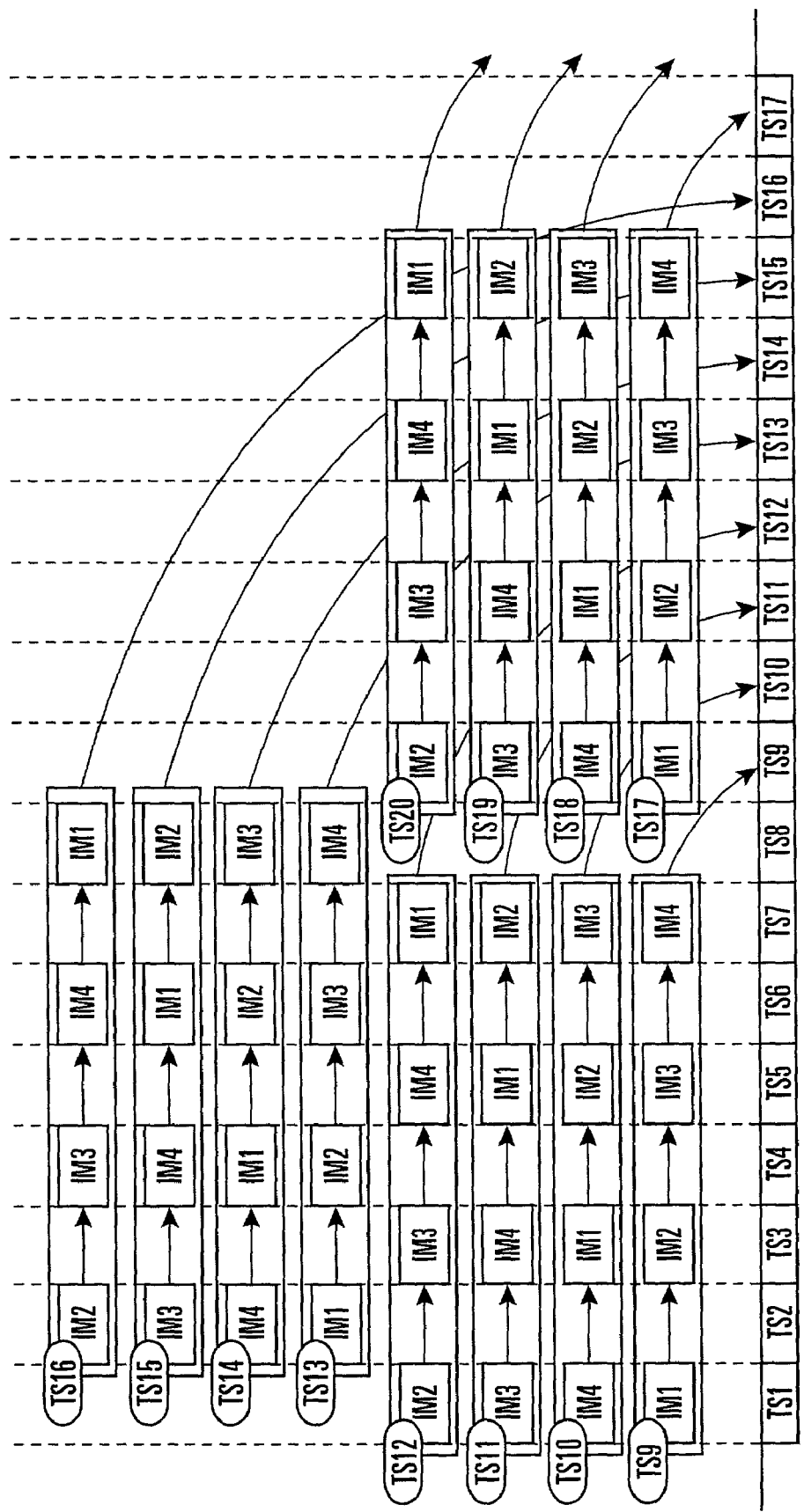
FIG. 4 is a timing chart showing scheduling operation in the first embodiment of the present invention.

FIG. 4 shows scheduling operation of the first embodiment of the present invention. This operation is scheduling operation based on framed RRGS. FIG. 4 shows case where module count N=4, and a method of determining a reservation sequence from TS9. The encircled time slot numbers (TS9 to TS20) indicate time slots that are reserved by a series of pipeline operations.

Time slots in which IM numbers (IM1 to IM4) are written indicate time slots in which reservation processing is executed. Time slots in which arrows are written indicate time slots in which format conversion processing, transfer processing, and expansion processing of reservation output port information are executed. The last curved arrow indicates a time slot as a reservation target.

Consider the correspondence between the operations in FIGS. 3 and 4. Referring to FIG. 4, for example, IM2 executes reservation processing for TS9 in the interval between TS2 and TS4. This corresponds to reservation processing for TS-r in the interval between TS-a and TS-c in FIG. 3.

Scheduling for TS9 is executed as follows. TS1 represents a scheduling start time slot; and TS7, a last time slot. Reserving operation is started from the distributed scheduling module IM1 and terminated at IM4. First of all, the distributed scheduling module IM1 performs reserving operation in TS1. In TS2, output port reservation information for TS9 is transferred from the distributed scheduling module IM1 to IM2.

In TS3, the distributed scheduling module IM2 performs reserving operation. In TS4, the output port reservation information for TS9 is transferred from the distributed scheduling module IM2 to IM3. Subsequently, the distributed scheduling modules IM3 and IM4 perform reserving operation. When the distributed scheduling module IM4 performs reserving operation in TS7, the reservation for TS9 by the respective distributed scheduling modules IM1 to IM4 is completed.

Each module uses the reservation information 12 for TS9, which was determined upon execution of reserving operation and stored in the connection permission storage section 16, in TS9. Scheduling for TS10, TS11, and TS12 is started by the distributed scheduling modules IM4, IM3, and IM2 from TS1 and completed at TS7.

Scheduling for TS13, TS14, TS15, and TS16 is executed in the interval between TS2 and TS8. In the interval between TS1 and TS8, connection reservations for TS9 to TS16 are determined.

Pipeline processing can also be realized by the above method even in reservation processing in which distributed pipeline scheduling based on framed RRGS is used, and a reservation processing time coincides with one time slot.

Figure 5:
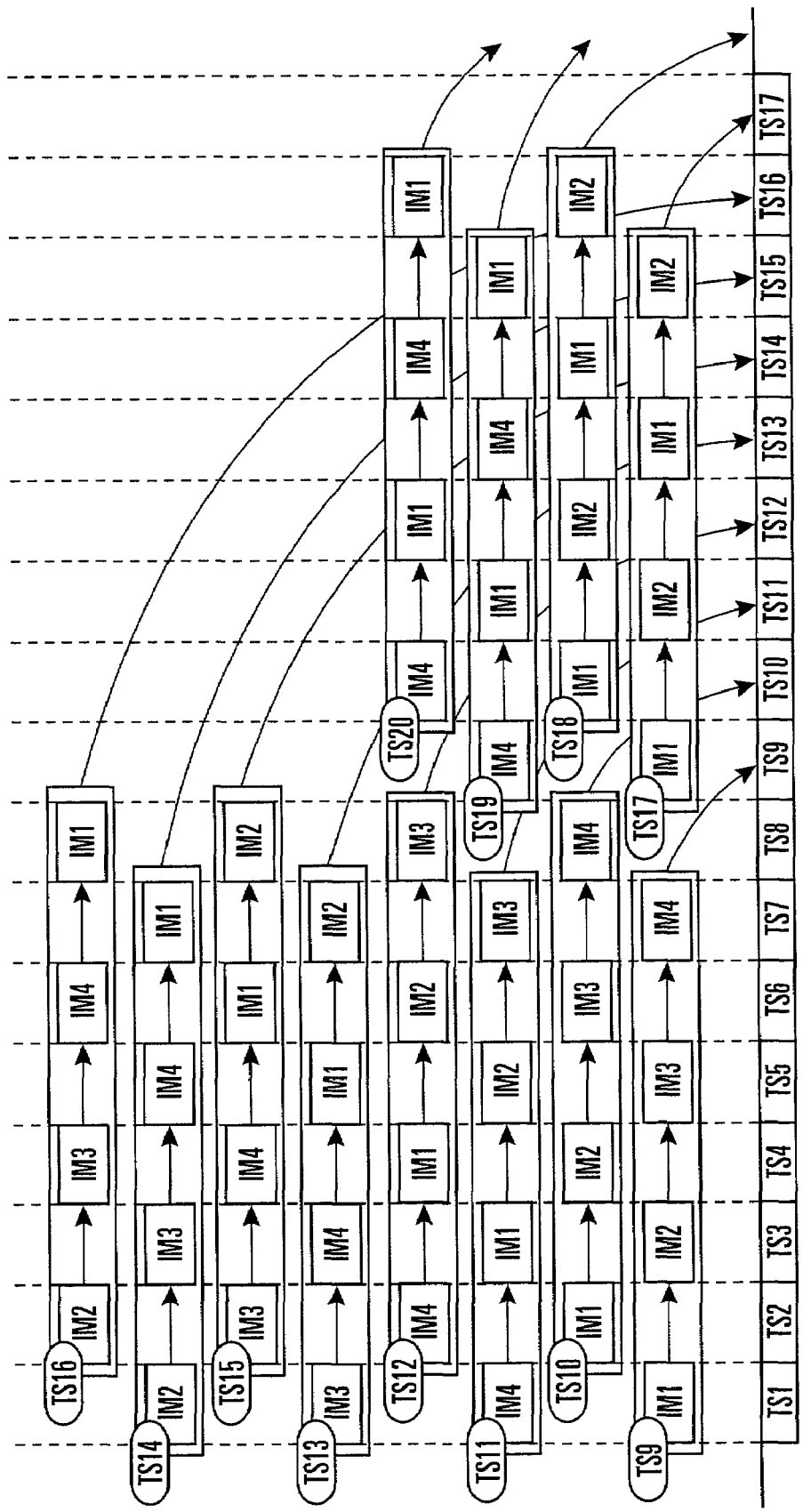
FIG. 5 is a timing chart showing scheduling operation in the second embodiment of the present invention.

FIG. 5 shows scheduling operation in the second embodiment of the present invention. This operation is also scheduling operation based on framed RRGS. FIG. 5 shows a case where module count N=4, and a method of determining a reservation sequence from TS9.

The following is the difference between this embodiment and the first embodiment of the present invention shown in FIG. 4. In the first embodiment, the combination of reservation time slots for which processing is started from TS1 are TS9, TS10, TS11, and TS12, and the combination of reservation time slots for which processing is started from TS2 are TS13, TS14, TS15, and TS16. In contrast to this, in this embodiment, reservation time slots for which processing is started from TS1 are TS9, TS11, TS13, and TS15, and reservation time slots for which processing is started from TS2 are TS10, TS12, TS14, and TS16.

As shown in FIG. 5, in the second embodiment as well, TS1 is a start reservation time slot. As in the first embodiment, connection reservations for TS9 to TS16 can be determined in the interval between TS1 and TS8. This makes it possible to obtain effects similar to those in the first embodiment.

Figure 6:
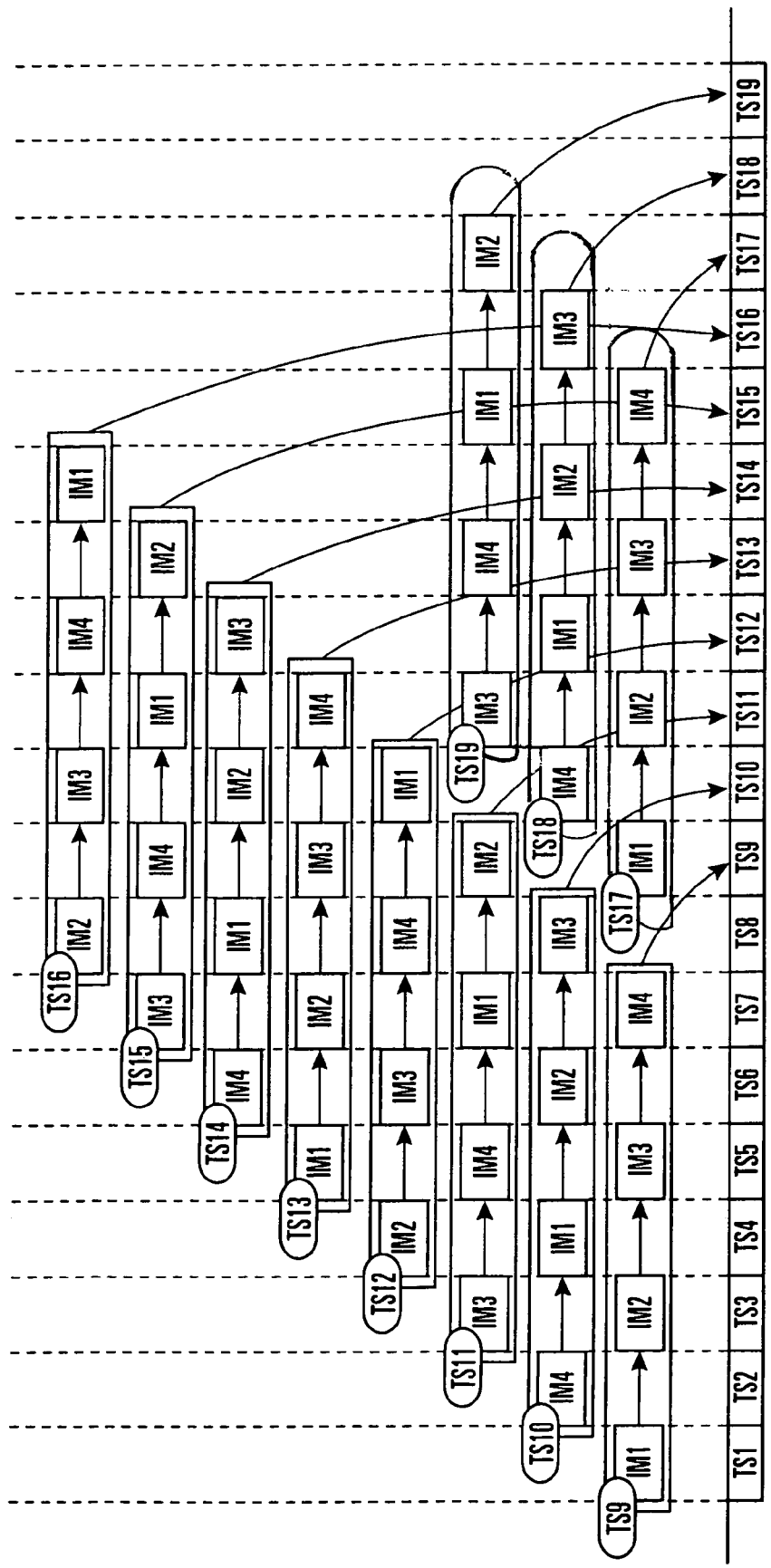
FIG. 6 is a timing chart showing scheduling operation in the third embodiment of the present invention.

FIG. 6 shows scheduling operation in the third embodiment of the present invention. This operation is scheduling operation based on RRGS. FIG. 6 shows a case where the number of modules used is an even number, i.e., N=4, and a method of determining a reservation sequence from TS9.

Scheduling for TS9 is started from a distributed scheduling module IM1 in TS1. In TS3, a distributed scheduling module IM2 performs reservation processing. In TS5, a distributed scheduling module IM3 performs reservation processing. In TS7, a distributed scheduling module IM4 performs reservation processing. In TS2, TS4, and TS6, transfer processing is performed. Subsequently, scheduling for TS10 is started from the distributed scheduling module IM4 in TS2. In TS4, the distributed scheduling module IM1 performs reservation processing. In TS6, the distributed scheduling module IM2 performs reservation processing. In TS8, the distributed scheduling module IM3 performs reservation processing. In TS3, TS5, and TS7, transfer processing is performed. Subsequently, reservation processing for time slots are sequentially executed.

As shown in FIG. 6, when N is an even number, processing is start from each time slot, and connection reservations for time slots 2N time slots ahead of the current time slot can be determined.

Figure 7:
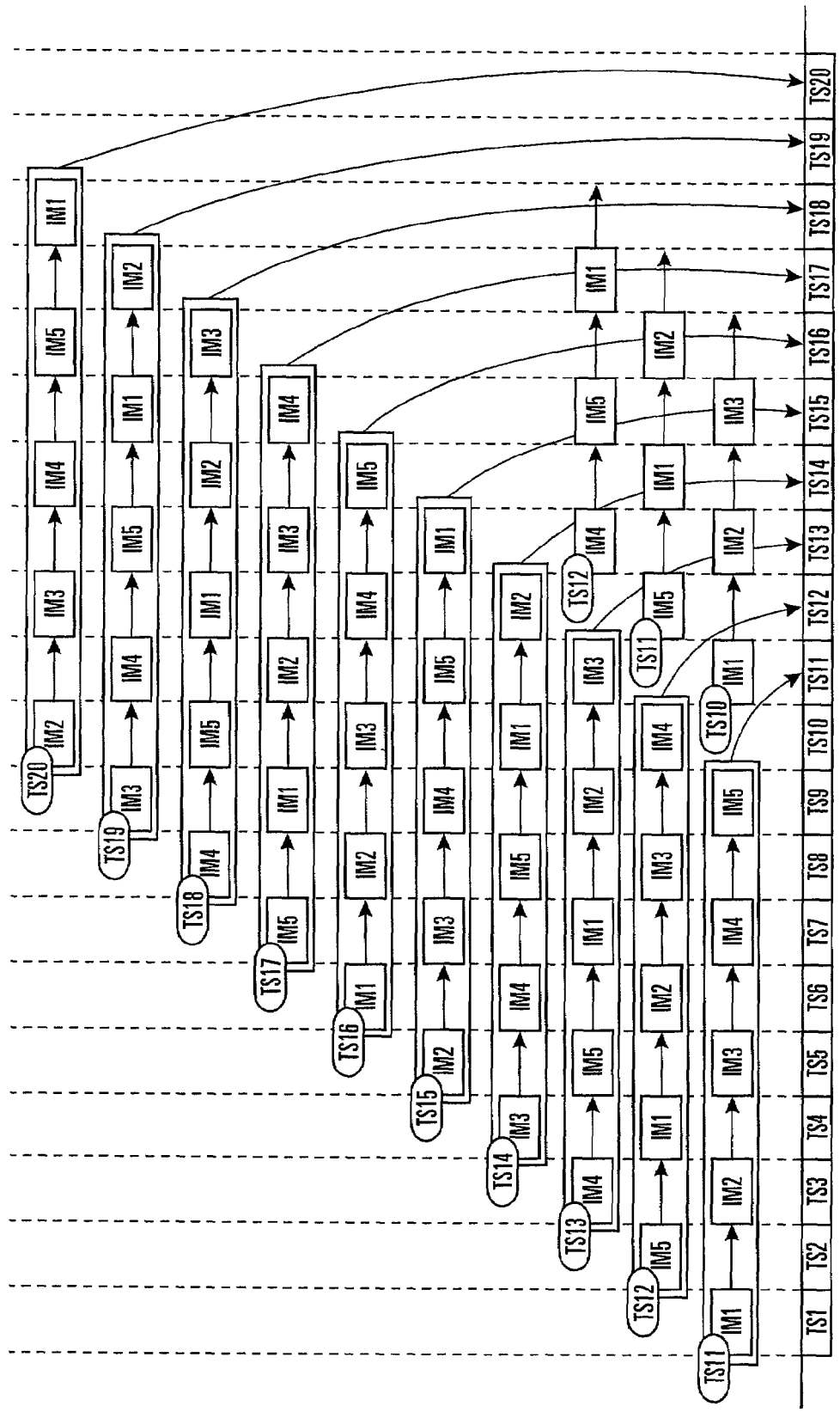
FIG. 7 is a timing chart showing scheduling operation in the fourth embodiment of the present invention.
Figure 8:
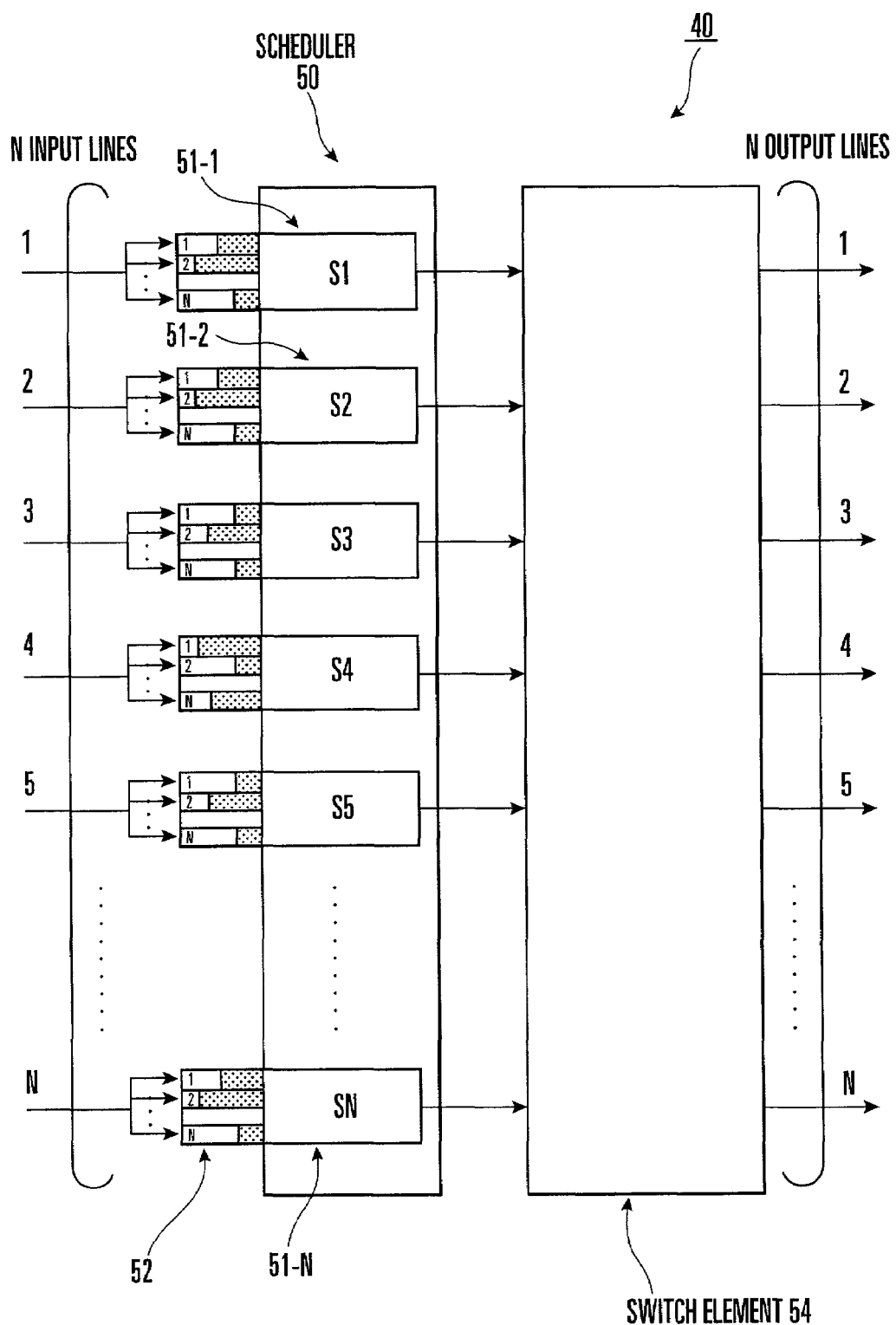
FIG. 8 is a block diagram showing the arrangement of a conventional input buffer type packet switch having N inputs and N outputs (N is a natural number)

FIG. 7 shows scheduling operation according to the fourth embodiment of the present invention. This operation is scheduling operation based on RRGS as in the operation shown in FIG. 6. FIG. 7 shows a case where module count N=5, and a method of determining a reservation sequence from TS11. As shown in FIG. 7, even if N is an odd number, processing is started from each time slot, and connection reservations for time slots 2N time slots ahead of the current time slot can be determined.

As is obvious from a comparison between the operation in FIG. 7 and the operation in FIG. 6, in the distributed scheduling method according to the present invention, when scheduling operation based on RRGS is performed, the algorithm remains unchanged regardless of whether the number of modules is an even or odd number. Unlike the conventional scheduling operation using RRGS singly, the same distributed scheduling modules can be used regardless of whether the number of modules is an even or odd number.

In the first to fourth embodiments, when N modules are present, reservation processing is executed for reservations for future time slots 2N time slots ahead of a time slot from which reservation processing is started. However, reservation processing can also be executed for reservations for future time slots 2N−1 time slots ahead of a time slot from which reservation processing is started.

Since N−1 transfer operations are enough to transfer information from the first module to the last module by using N modules, connection reservations are determined at a time point after a lapse of 2N−1 time slots from a time slot from which reservation processing is started. Therefore, reservation processing can be executed for reservations for future time slots 2N−1 time slots ahead of each time from which processing is started.

As a scheduling method of arbitrating connection requests for an input buffer type cross-bar switch, the following method is available. In this method, a plurality of input ports are grouped and accommodated into one distributed scheduling module, and connection request arbitration (reservation assignment) is executed for the input ports grouped in the module. Connection request arbitration for input ports between modules is executed by pipeline processing. A combination of such a scheduling method and the methods of the four embodiments described above can also be realized without impairing the effects of each method.

The following two methods can be used as scheduling methods of arbitrating connection requests for an input buffer type cross-bar switch. According to one method, inequality concerning reservation assignment among ports is eliminated by changing the connections between distributed scheduling modules using an external switch. In the other method, inequality concerning the average values of delay times with respect to connection permission responses to connection requests among ports is eliminated by changing in units of frames the processing sequence of reservation time slots in a processing frame in modules. A combination of these two methods and the methods of the four embodiments described above can also be realized without impairing the effects of each method.

As has been described above, according to the present invention, information transfer processing between distributed scheduling modules, which is completed within one time slot, is separated from route assignment search processing (route reservation processing) in each distributed scheduling module, and a processing time of one time slot is assigned to each of the information transfer processing and the route reservation processing. In each input module, the output port reservation information receiving section, allocator, and output port reservation information transmitting section perform processing for a time slot for which different reservation times are set in the respective time slots.

According to the present invention, since one time slot can be entirely assigned to reservation processing, pipeline processing can be performed even if many ports are used and much time is required for reservation processing.

In addition, since one time slot can be assigned to information transfer processing, a much transfer time can be ensured, and necessary information can be transferred without using any high-speed clock even if many ports are used and a large amount of information must be transferred.

What is claimed is:

1. A distributed pipeline scheduling method for a packet switching system which includes a plurality of input ports for inputting data, a plurality of output ports for outputting data, a data switch element for switching the data input from the input ports and transferring the data to the output ports, and a scheduler having a distributed scheduling architecture including a plurality of scheduling modules for controlling the data switch element, and determines connection reservations between the input ports and the output ports, comprising the steps of:

causing the scheduler to independently assign time slots of the same size to information transfer processing that processes data to be transferred from one scheduling module to another and reservation processing that determines an output port for switching data input from an input port, respectively, wherein each of the time slots assigned for information transfer processing can only be used for information transfer processing of and each of the time slots assigned for reservation processing can only be used for reservation processing; and processing information transfer processing and reservation processing in the assigned time slots in a pipeline fashion.

2. A method according to claim 1, wherein performing information transfer processing and reservation processing in units of time slots occurs in N(N is a natural number) distributed scheduling modules located in the scheduler, and the step of processing comprises the step of determining a connection reservation, by using the distributed scheduling module, for a predetermined time slot at a time point after a lapse of a time corresponding to 2N−1 time slots from a time slot from which the reservation processing is started.

3. The pipeline scheduling method according to claim 1, wherein the time slots of the same size are determined as being the largest among (a) time for information transfer reception and information expansion, (b) time for reservation processing, and (c) time for format conversion and information transfer transmission.

4. A distributed pipeline scheduling packet switching system comprising:

a plurality of input ports for inputting data;

a plurality of output ports for outputting data; and a data switch element for switching the data input from the input ports and transferring the data to the output ports, and a scheduler having a distributed scheduling architecture for controlling the data switch element, wherein said scheduler comprises a plurality of scheduling modules for performing reservation processing for different time slots at the same time in a pipeline fashion, and said scheduling modules respectively comprise information transfer processing means and reservation processing means for performing information transfer and reservation processing for different time slots at the same time in a pipeline fashion, wherein the information transfer processing means processes data to be transferred from one scheduling module to another while the reservation processing means determines an output port for switching data input from an input port, wherein the different time slots are of the same size and wherein information transfer processing and reservation processing are respectively performed in the different time slots of the same size, and wherein each of the time slots used for information transfer processing can only be used for information transfer processing and each of the time slots used for reservation processing can only be used for reservation processing.

5. The pipeline scheduling system according to claim 4, wherein the time slots of the same size are determined as being the largest among (a) time for information transfer reception and information expansion, (b) time for reservation processing, and (c) time for format conversion and information transfer transmission.

6. A distributed scheduler for distributed pipeline scheduling which is used by a packet switch in a packet switching system, comprising a plurality of scheduling modules respectively having output port reservation information receiving sections, allocators, and output port reservation information transmitting sections and serving to perform distributed scheduling, wherein said output port reservation information receiving sections, allocators, and output port reservation information transmitting sections within each input module simultaneously execute processing for different reservation time slots, wherein the processing comprises information transfer processing and reservation transfer processing performed, respectively, in time slots of the same size, wherein the information transfer processing processes data to be transferred from one scheduling module to another while the reservation processing determines an output port for switching data input from an input port, wherein each of the time slots for information transfer processing can only be used for information transfer processing and each of the time slots for reservation processing can only be used for reservation processing.

7. The pipeline scheduler according to claim 6, wherein the time slots of the same size are determined as being the largest among (a) time for information transfer reception and information expansion, (b) time for reservation processing, and (c) time for format conversion and information transfer transmission.

* * * * *